United States Patent
Suwa

(10) Patent No.: US 6,775,555 B2
(45) Date of Patent: Aug. 10, 2004

(54) CORDLESS TELEPHONE AND METHOD FOR CONTROLLING TRANSMISSION POWER OF HANDSET UNIT THEREOF

(75) Inventor: Yutaka Suwa, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 428 days.

(21) Appl. No.: 09/854,903

(22) Filed: May 15, 2001

(65) Prior Publication Data

US 2002/0010009 A1 Jan. 24, 2002

(30) Foreign Application Priority Data

May 17, 2000 (JP) ........................................ 2000-145190

(51) Int. Cl.[7] ............................. H04M 1/00; H04Q 7/20

(52) U.S. Cl. ........................ 455/522; 455/69; 455/574; 455/465; 370/280; 370/358

(58) Field of Search ............................. 455/522, 69, 70, 455/67.13, 63.2, 465, 574; 370/280, 350

(56) References Cited

U.S. PATENT DOCUMENTS

| | | | | |
|---|---|---|---|---|
| 6,101,176 A | * | 8/2000 | Honkasalo et al. | 370/335 |
| 6,341,224 B1 | * | 1/2002 | Dohi et al. | 455/522 |
| 6,449,462 B1 | * | 9/2002 | Gunnarsson et al. | 455/67.13 |

* cited by examiner

*Primary Examiner*—Nick Corsaro
*Assistant Examiner*—Alan T. Gantt
(74) *Attorney, Agent, or Firm*—McDermott Will & Emery LLP

(57) ABSTRACT

A cordless telephone controls the handset unit power based on both RSSI value and CRC error rate (CRCE). The base unit requests the handset unit to set the power to "L" when the handset unit power information is "H", the CRCE is judged to be not more than a predetermined rate, and the RSSI value is judged to be not less than a first predetermined value. The base unit further requests the handset unit to set the power to "H" when the handset unit information is "L" and the RSSI value is judged to be not more than a second predetermined value. Moreover, the base unit requests the handset unit to set to the power to "H" when the handset power information is "L", the RSSI value is judged to be larger than a second predetermined value, and the CRCE is judged to be larger than a predetermined rate.

6 Claims, 5 Drawing Sheets

CORDLESS TELEPHONE AND METHOD FOR CONTROLLING TRANSMISSION POWER OF HANDSET UNIT THEREOF

FIELD OF THE INVENTION

The present invention relates to a cordless telephone for making wireless communications between a base unit and a handset unit, and controlling transmission power of handset unit, and method for controlling transmission power of handset unit in the cordless telephone.

BACKGROUND OF THE INVENTION

Recently, along with wide spread of cordless telephones, the battery life of the handset unit of the cordless telephone is becoming an important issue. The base unit of the cordless telephone is connected to a commercial power source, and battery is not used.

The handset unit operates on its battery. Therefore, when the power consumption of the handset unit is large, the battery life is short. The battery needs to be replaced frequently, and the running cost increases, and possibility of disability of use increases.

To extend the battery life as long as possible, it has been proposed to control the transmission power in the handset unit (hereinafter called handset unit power). In this handset unit power control method, the handset unit power is controlled based on received signal strength indicator (RSSI) value of the handset unit.

The higher the RSSI value is, the shorter the distance between the base unit and handset unit is, and it seems there is no problem if the handset unit power is set at low transmission power (called "L" hereinafter; in the case of high transmission power, "H"). In this case, the handset unit power is set at "L", and the power consumption of the battery is saved, and the battery life is extended.

Thus, based on the RSSI value, generally, the handset unit power is controlled, and the power consumption is saved.

SUMMARY OF THE INVENTION

It is hence an object of the invention to present a cordless telephone further easier to use while saving power consumption. More specifically, the invention presents a cordless telephone for controlling handset unit power while keeping the reception quality, in consideration of bit error rate (BER) as well as RSSI value, and a method of controlling the handset unit power.

The cordless telephone of the invention comprises:

a) a base unit controller incorporated in a base unit for outputting a control signal for controlling the handset unit power responsive to the CRC error rate (CRCE) and received signal strength indicator (RSSI) value of the base unit, and b) a handset unit controller incorporated in a handset unit for receiving a control signal from the base unit and controlling the handset unit.

The base unit controller i) requests the handset unit controller to set the handset unit transmission power (handset unit power) to high value when the CRCE is larger than a predetermined value, ii) requests the handset unit controller to set the handset unit power to high value when the RSSI value is not more than a predetermined value, and iii) requests the handset unit controller to set the handset unit power to low value when the CRCE is not more than a predetermined value and the RSSI value is larger than a predetermined value.

The handset unit controller sets the handset unit power base on at least one of the control signal and the determination by the handset unit controller.

The control method of handset unit transmission power in the cordless telephone of the invention comprises the steps of:

a) outputting a request for controlling the transmission power of a handset unit, responsive to the CRC error rate (CRCE) and received signal strength indicator (RSSI) value of the base unit, in the base unit, and b) controlling the handset unit, by receiving a control signal, in the handset unit.

The base unit, i) requests the handset unit controller to set the handset unit power to high value when the CRCE is larger than a predetermined value, ii) requests the handset unit to set a hand set transmission power at high value when the RSSI value is not more than a predetermined value, and iii) requests the handset unit power to set the handset unit power to low value when the CRCE is not more than a predetermined value and the RSSI value is larger than a predetermined value.

The handset unit sets the handset unit power based on either the control signal or the determination by the handset unit controller.

Thus, the control method of handset unit power for controlling the handset unit power based on both RSSI value and CRC error rate is obtained.

DESCRIPTION OF THE PREFERRED EMBODIMENT

The control method of handset unit power in a cordless telephone determined based on only the RSSI value cannot avoid deterioration of reception when the BER is high.

In the following embodiment, the BER is determined by the CRCE. The handset unit power is controlled on the basis of this result and the RSSI value.

The embodiment of the invention is explained by referring to FIG. 1 to FIG. 5.

Figure 1:
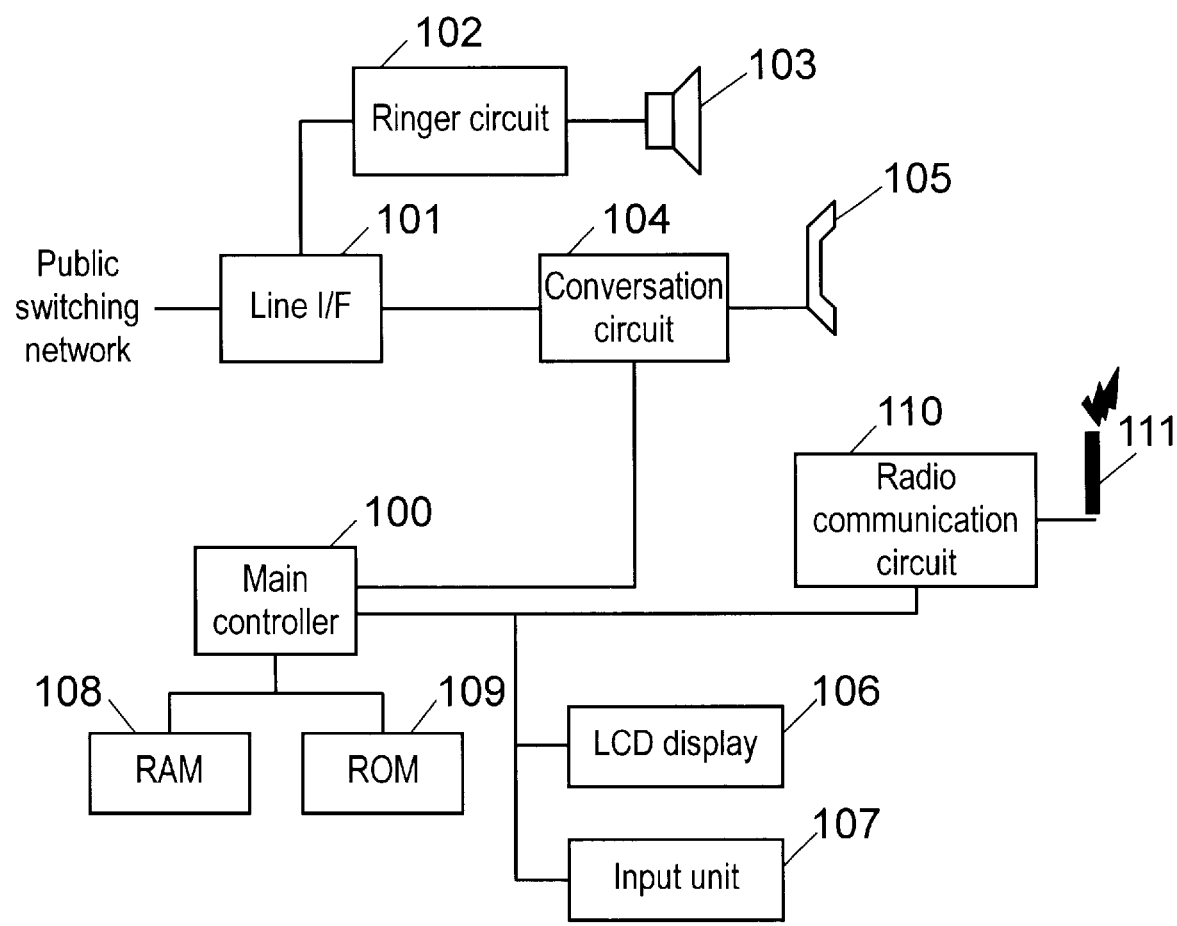
FIG. 1 is a block diagram showing a general base unit.
Figure 2:
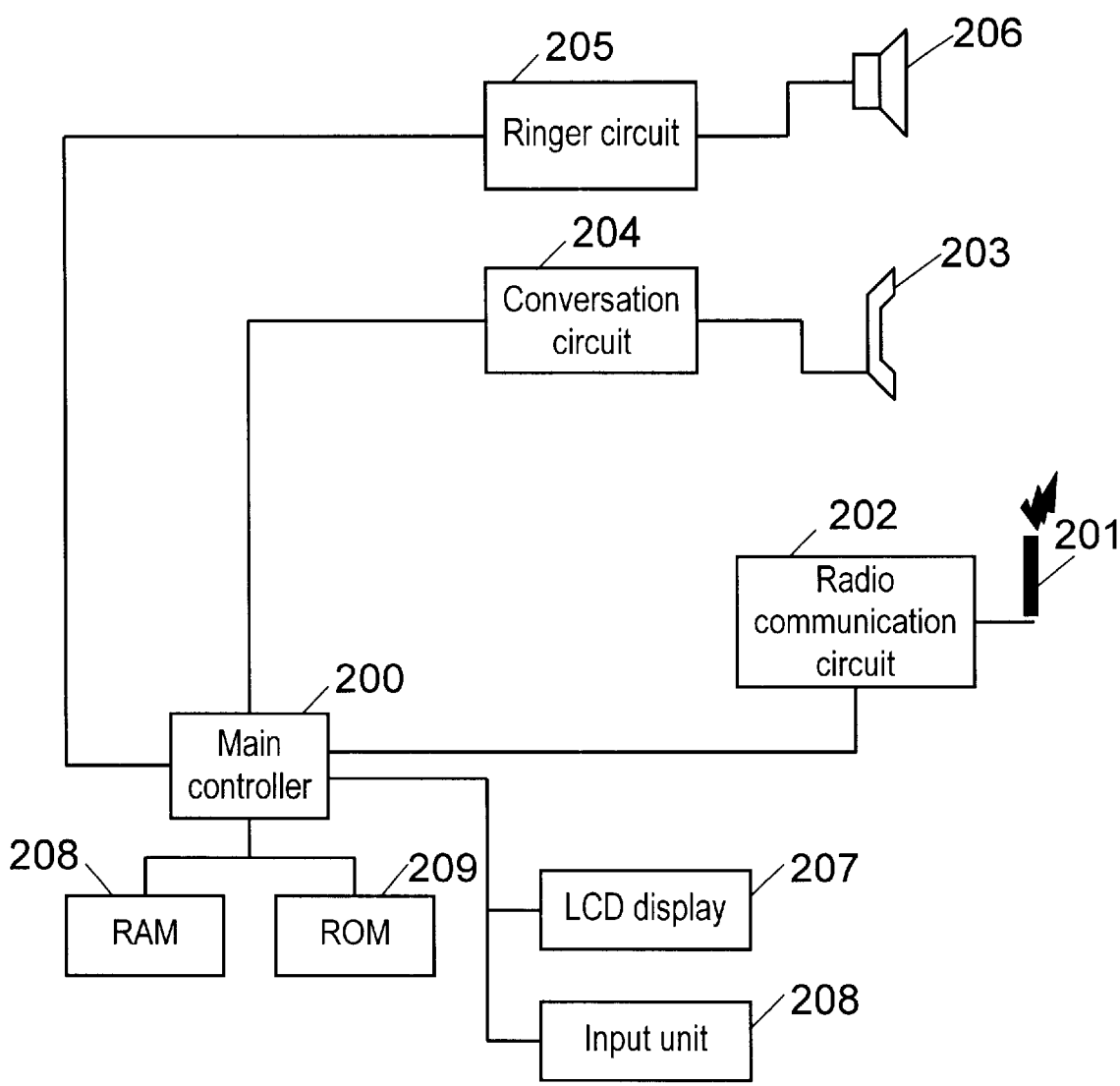
FIG. 2 is a block diagram showing a general handset unit.

First, a general structure of cordless telephone is explained by referring to FIG. 1 and FIG. 2. FIG. 1 is a block diagram showing a base unit in general. FIG. 2 is a block diagram showing a handset unit in general.

In FIG. 1, a main controller 100 operates as a base unit controller for controlling the entire mechanism. A line interface (line I/F) 101 matches the operation timing with the public switching network. A ringer circuit 102 detects a bell ringing and generates ringer sound. A speaker 103 produces ringer sound. A conversation circuit 104 communicates with a partner telephone on the public switching network. The speaker and a microphone 105 are used in conversation. A display unit 106 is an LCD display or the like, and shows data. An input unit 107 instructs by button pressing or the like. A RAM 108 stores data as a base unit memory. A ROM 109 stores program, etc. A radio communication circuit 110 transmits and receives radio signal through an antenna 111.

In FIG. 2, a main controller 200 operates as a handset unit controller for controlling the entire operation. A radio communication circuit 202 transmits and receives radio signal to and from the base unit through an antenna 201. A speaker and a microphone 203 are used in conversation. A conversation circuit 204 communicates with a partner telephone on the public switching network through the base unit. A ringer circuit 205 generates ringer sound. A speaker 206 produces ringer sound. A display unit 207 is an LCD display or the like, and shows data. An input unit 208 instructs by button pressing or the like. A RAM 209 stores data as a handset unit memory. A ROM 210 stores program, etc.

Figure 3A:
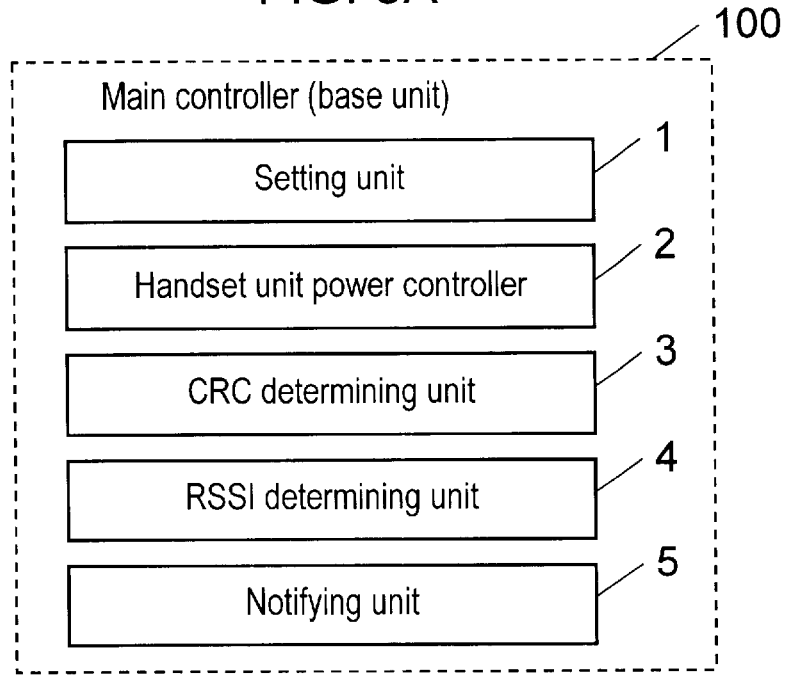
FIG. 3A is a functional block diagram of main controller of base unit.
Figure 3B:
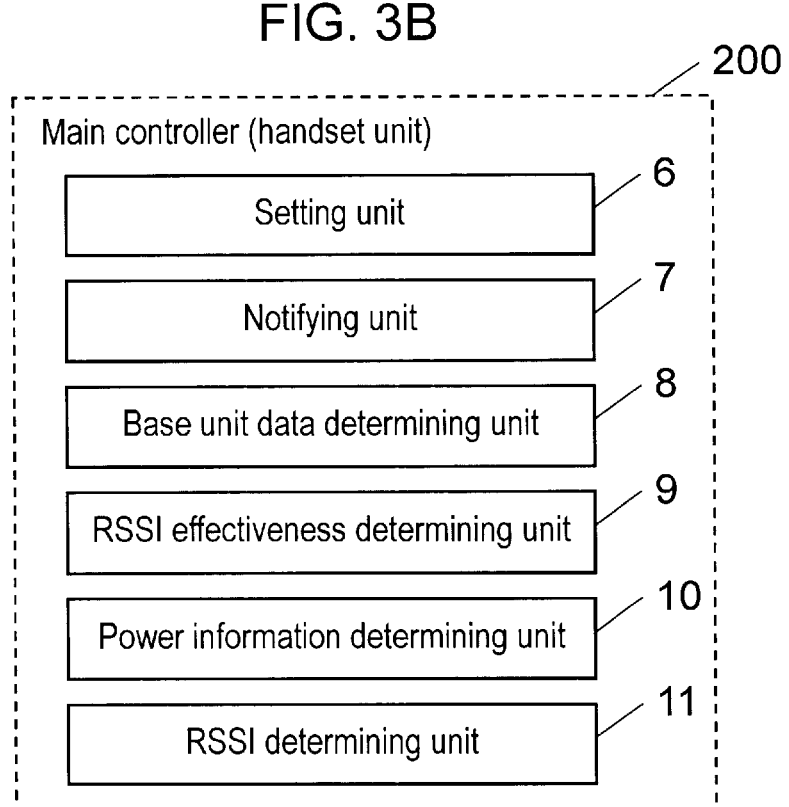
FIG. 3B is a functional block diagram of main controller of handset unit.

FIG. 3A is a functional block diagram showing a function implementing section in the main controller of base unit (base unit controller) 100. FIG. 3B is a functional block diagram showing a function implementing section in the main controller of handset unit (handset unit controller) 200.

In FIG. 3A, a setting unit 1 sets the handset unit power information to high power (H) or low power (L).

A handset unit power information determining unit 2 judges whether the handset unit power information is "H" or "L". A CRC determining unit 3 compares a CRC error rate (CRCE) which is an error rate based on CRC, and a predetermined error rate E.

Herein, a redundancy check code of specified pattern is transmitted from the handset unit to the base unit for error rate check. The CRC determining unit 3 determines the CRC error rate by using this pattern.

An RSSI determining unit 4 compares the RSSI value in the base unit with a first predetermined value X or second predetermined value Y.

A notifying unit 5 makes requesting or notifying to the handset unit.

In FIG. 3B, a setting unit 6 sets the handset unit power.

A notifying unit 7 makes notifying to the base unit.

A base unit data determining unit 8 judges the data from the base unit.

An RSSI effectiveness determining unit 9 judges whether or not to employ the RSSI value as effective data for control when controlling the handset unit power to "H" or "L".

A power information determining unit 10 judges the handset unit power information.

An RSSI determining unit 11 compares the RSSI value in the handset unit with a first predetermined value X or second predetermined value Y.

Figure 4:
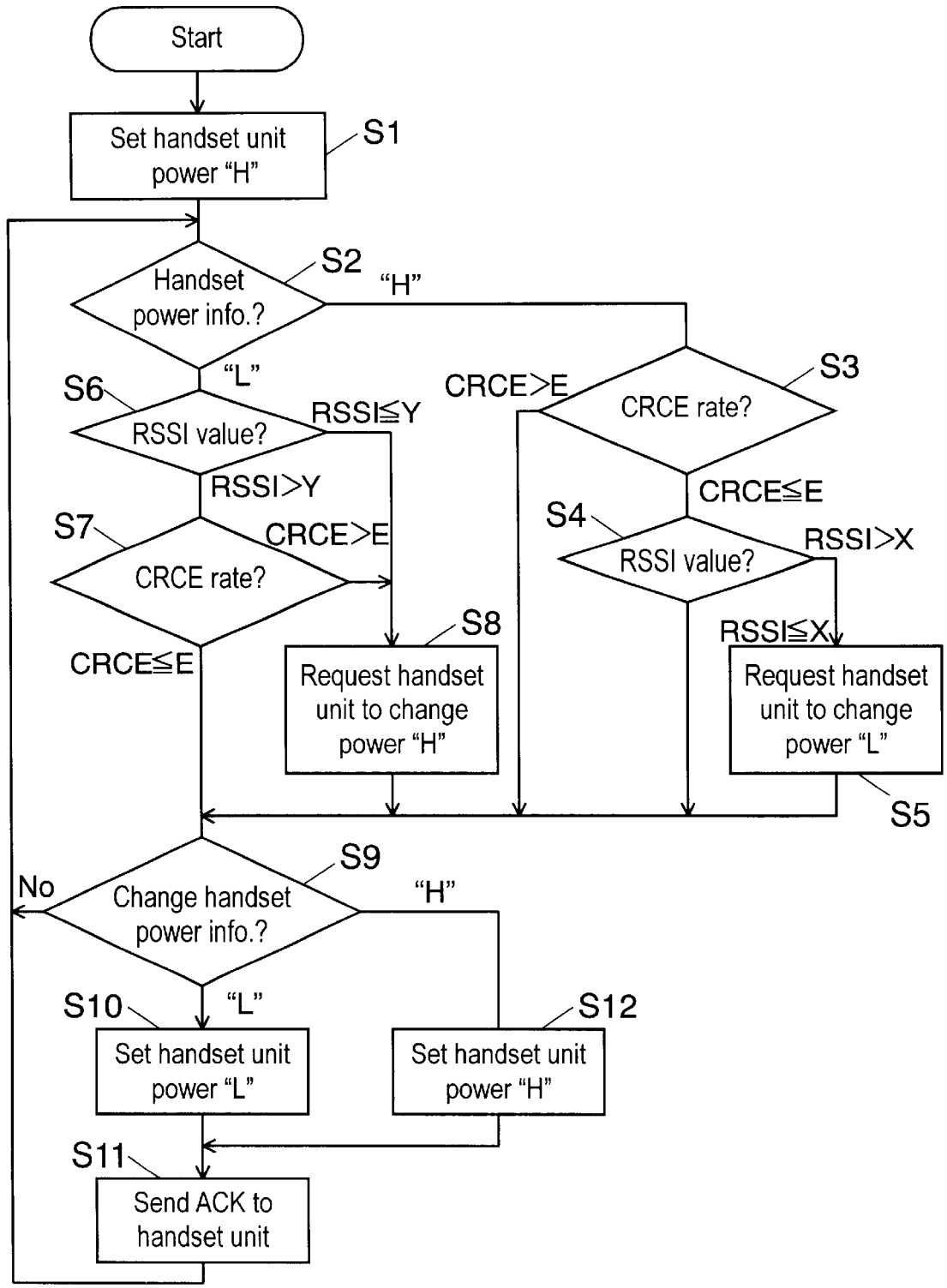
FIG. 4 is a flowchart showing control operation of handset unit power in the base unit.
Figure 5:
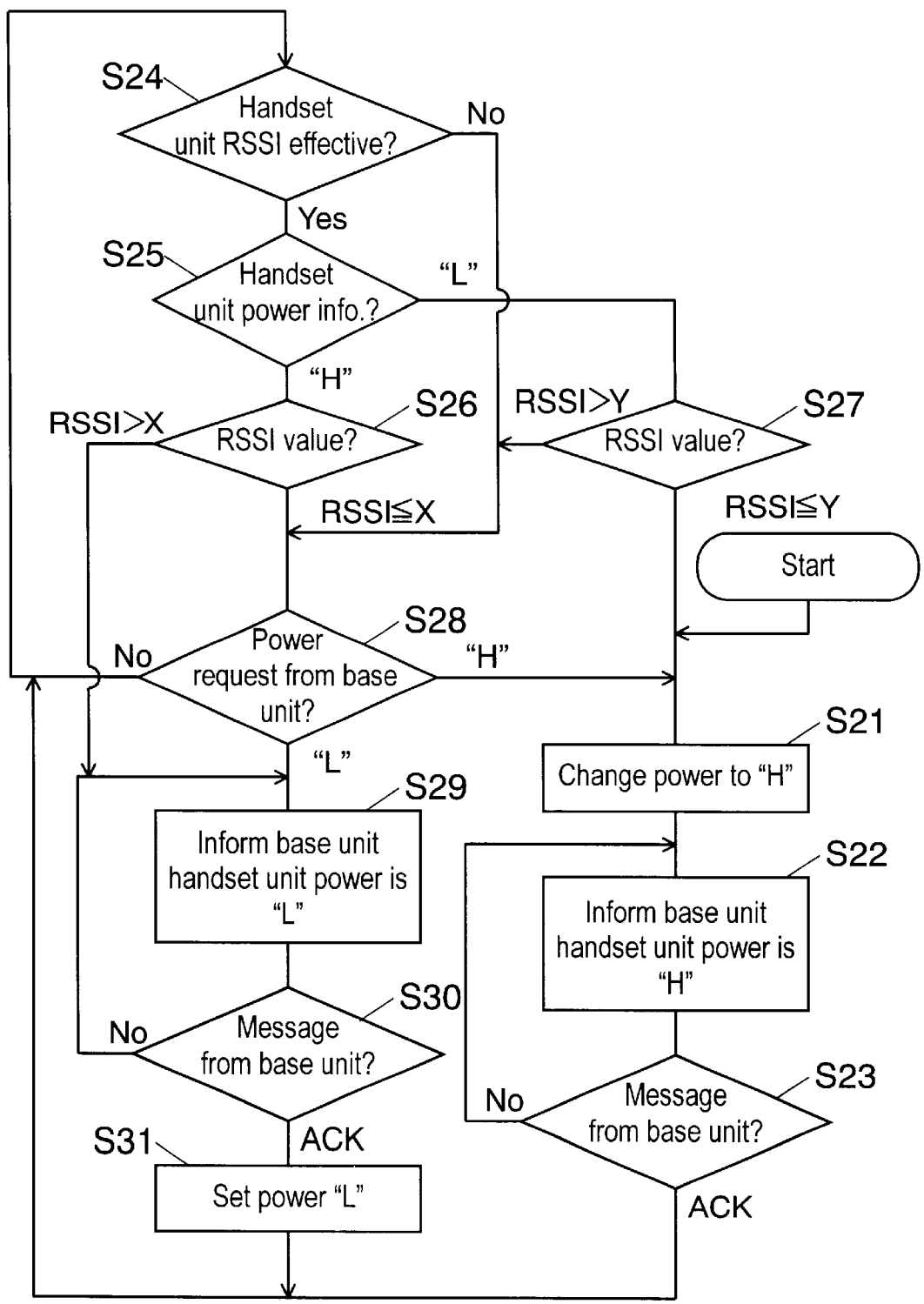
FIG. 5 is a flowchart showing control operation of handset unit power in the handset unit.

In the base unit and handset unit of the cordless telephone having such a configuration, the operation is explained by referring to FIG. 4 and FIG. 5. FIG. 4 is a flowchart showing control operation of handset unit power in the base unit. FIG. 5 is a flowchart showing control operation of handset unit power in the handset unit.

First, the handset unit power control operation in the base unit is explained.

In FIG. 4, when a conversation starts, the setting unit 1 sets "H" as the initial value of handset unit power information (Si).

Next, the handset unit power information determining unit 2 judges whether the handset unit power information is "H" or "L" (S2).

Initially, the handset unit power information is "H", and the process goes to step S3. At step S3, the CRC determining unit 3 compares the CRC error rate (CRCE) with a predetermined error rate E, and judges whether CRCE$\leq$E or CRCE>E.

In the case of CRCE>E, it means that the error rate CRCE is high although the handset unit power information is "H". Therefore, the handset unit power information maintains the "H" state of the handset unit power, and the process goes to step S9.

If judged to be CRCE$\leq$E at step S3, the RSSI determining unit 4 compares the RSSI value with the first predetermined value X (for example, −50 dB).

In the case of RSSI$\leq$X, since the reception level is low, the handset unit power maintains the "H" state of the handset unit power, and the process goes to step S9.

In the case of RSSI>X, since the RSSI value is sufficiently high, the notifying unit 5 requests the handset unit to change the handset unit power to "L", through the radio communication circuit 110 and antenna 111.

At step S2, when the handset unit power information is judged to be "L", the RSSI determining unit 4 compares the RSSI value with the second predetermined value Y (for example, −60 dB) (S6).

In the case of RSSI$\leq$Y, the reception level is judged to be low, and the notifying unit 5 requests the handset unit to change the handset unit power to "H" (S8).

In the case of RSSI>Y, the RSSI value is only higher than the second predetermined value which is lower than the first predetermined value X, and the CRC determining unit 3 compares the CRC error rate (CRCE) with the predetermined error rate E (S7).

In the case of CRCE>E, the error rate CRCE is high, and the notifying unit 5 requests the handset unit to change the handset unit power to H (S8).

In the case of CRCE$\leq$E, since the error rate CRCE is low, the "L" state of the handset unit power is maintained, and the process goes to step S9.

At step S9, the handset unit determining unit 2 judges whether the handset unit power information from the handset unit is "H" or "L". If nothing is shown, going back to step S2, and if "L", the setting unit 1 sets the handset unit power information to "L" (S10).

At this time, the notifying unit 5 notices an acknowledgement response (ACK) to the handset unit (S11).

When the handset unit power information is "H", the setting unit 1 sets the handset unit power information to "H" (S12).

At this time, the notifying unit 5 notices an acknowledgement response (ACK) to the handset unit (S11).

The handset unit power control operation in the handset unit is explained by referring to FIG. 5.

In FIG. 5, first, when a conversion starts, the setting unit 6 sets the handset unit power to H (S21).

The notifying unit 7 notices that the handset unit power is "H" to the base unit by way of the radio communication circuit 202 and antenna 201 (S22).

If an ACK message is sent from the base unit, the process goes to step S24 (S23).

At step S24, the RSSI effectiveness determining unit 9 judges whether or not to employ the RSSI value as effective data for handset unit power control.

For example, an effective flag is stored in an EEPROM (not shown), and it is judged effective when the effective flag is "1", or ineffective if "0". When the RSSI value is effective, the power information determining unit 10 judges whether the handset unit power information is "H" or "L" (S25).

If judged to be "H", the RSSI determining unit 11 compares the RSSI value with the first predetermined value X (S26).

In the case of RSSI>X, since the reception level is high, the notifying unit 7 notices the base unit that the handset unit power is "L" (S29, S30), and the setting unit 11 changes the setting of the handset unit power to L (S31).

In the case of RSSI≦X, the process goes to step S28 while maintaining the handset unit power information at "H".

At step S28, the base unit determining unit 8 judges whether the power request from the base unit is "H" or "L", and if there is no request, the process goes to step S24, and if a request for "H" is made, the process goes to step S21.

The operation at steps S21, S22, S23 is described above, and repeated explanation is omitted. If the power request from the base unit is "L", the process goes to step S29. The operation at steps S29, S30, S31 is also described above, and repeated explanation is omitted.

At step S24, if the RSSI is not judged to be effective, skipping decision at steps S25, S26, the process goes to step S28, and the base unit data determining unit judges whether the power request from the base unit is "H" or "L".

At step S25, if the handset unit power information is judged to be "L", the RSSI determining unit 11 compares the RSSI value with the second predetermined value Y (S27).

In the case of RSSI>Y, since the reception level is high, the process goes to step S28, and the base unit data determining unit judges whether the power request from the base unit is "H" or "L".

In the case of RSSI≦Y, since the reception level is low, the setting unit 6 changes the setting of the handset unit power to "H" (S21).

Thus, according to the embodiment, the base unit controller 100 comprises:

a handset unit determining unit 2 for judging whether the handset unit power information is "H" or "L", an RSSI determining unit 4 for comparing the RSSI value in the base unit with the first predetermined value X or second predetermined value Y, a CRC determining unit 3 for comparing the CRC error rate (CRCE) with a predetermined error rate E, and a notifying unit 5 for making requesting or noticing to the handset unit.

The notifying unit 5

1) requests the handset unit to set the handset unit power to "L", when i) the handset unit power information is judged to be "H", ii) the CRC error rate (CRCE) is judged to be not more than the predetermined error rate E, and iii) the RSSI value is judged to be not less than the first predetermined value X, 2) requests the handset unit to set the handset unit power to "H", when i) the handset unit power information is judged to be "L", and ii) the RSSI value is judged to be not more than the second predetermined value Y, and 3) requests the handset unit to set the handset unit power to "H", when i) the handset unit power information is judged to be "L", ii) the RSSI value is judged to be larger than the second predetermined value Y, and iii) the CRC error rate (CRCE) is judged to be larger than the predetermined error rate E.

The handset unit controller 200 sets the handset unit power responsive to the request from the base unit or based on the own determination.

Therefore, when the distance between the handset unit and base unit is sufficiently short and it is judged that it is enough if the handset unit power is "L", the handset unit power is set to "L". Thus, the transmission power of the handset unit is set to low power, and the life of the built-in battery may be extended.

If the CRC error rate is high although the distance of the handset unit and base unit is short, the handset unit power is set to "H", so that the error rate is decreased. Hence, communications including error in information are prevented.

Similarly, the handset unit controller 200 comprises:

a power information determining unit 10 for judging the handset unit power information, an RSSI determining unit 11 for comparing the RSSI value in the handset unit with a first predetermined value X or second predetermined value Y.

a base unit determining unit 8 for judging the data from the base unit, and a setting unit 6 for setting the handset unit power.

The setting unit 6

1) sets the handset unit power to "H" when i) the handset unit power information is judged to be "L", and ii) the RSSI value in the handset unit is judged to be not more than the second predetermined value Y, 2) sets the handset unit power to "L" when i) the handset unit power information is judged to be "H", and ii) the RSSI value in the handset unit is judged to be larger than the first predetermined value X, and 3) sets to "H" or "L" responsive to the request from the base unit, in which the handset unit itself controls the handset unit power according to the RSSI value.

Therefore, when the RSSI value is high, the handset unit power is set to "L". Thus, the power consumption of the handset unit power is decreased, and the battery life is extended.

The base unit controls the handset unit power to "H" or "L" based on the RSSI value and CRC error rate (CRCE). When the transmission power is higher than required, the power consumption of the handset unit power is decreased, and the battery life is extended. When the CRC error rate (CRCE) is high, the handset unit power is set to "H", and the error rate is lowered.

What is claimed is:

1. A cordless telephone for making radio communications between a base unit and a handset unit comprising:

a) a base unit controller incorporated in the base unit for outputting a control signal including a request for controlling the handset unit transmission power responsive to the CRC error rate (CRCE) and received signal strength indicator (RSSI) value of the base unit, and b) a handset unit controller incorporated in the handset unit for receiving the control signal from the base unit and controlling the handset unit, wherein said base unit controller:

i) sends the request to the handset unit controller to set the handset unit transmission power (handset unit power) to high value when the CRCE is larger than a predetermined error rate, ii) sends the request to set the handset unit power to high value when the RSSI value is not more than a predetermined value, and iii) sends the request to set the handset unit power to low value when the CRCE is not more than the predetermined error rate and the RSSI value is larger than a predetermined value, and said handset unit controller sets the handset unit power based on at least one of the control signal from the base unit controller and a determination by the handset unit controller.

2. The cordless telephone of claim 1,
wherein said base unit controller comprises:
   a-1) a handset unit power information determining unit for judging whether the handset unit power information is "H" or "U",
   a-2) an RSSI determining unit for comparing the RSSI value in the base unit with at least one of a first predetermined value and a second predetermined value not more than the first predetermined value,
   a-3) a CRC determining unit for comparing the CRC error rate with the predetermined error rate, and
   a-4) a notifying unit for making at least one of requesting and noticing to the handset unit, and
said notifying unit;
   i) sends a request to set the power to "L" to the handset unit when the handset unit power information is judged to be "H", the CRC error rate is judged to be smaller than the predetermined error rate, and the RSSI value is judged to be not less than the first predetermined value,
   ii) sends a request to set the power to "H" to the handset unit when the handset unit power information is judged to be "I", and the RSSI value is judged to be not more than the second predetermined value, and
   iii) sends a request to set the power to "H" to the handset unit when the handset unit power information is judged to be "I", the RSSI value is judged to be larger than the second predetermined value, and the CRC error rate is judged to be larger than the predetermined error rate.

3. The cordless telephone of claim 2,
wherein said handset unit controller comprises:
   b-1) a power information determining unit for judging the handset unit power information,
   b-2) an RSSI determining unit for comparing the RSSI value in the handset unit with the first predetermined value or the second predetermined value,
   b-3) a base unit data determining unit for judging the data from the base unit, and
   b-4) a setting unit for setting the handset unit power, and
said setting unit sets the handset unit power to "H" when the handset unit power information is judged to be "L", and the RSSI value in the handset unit is judged to be not more than the second predetermined value;
sets the handset unit power to "L" when the handset unit power information is judged to be "H", and the RSSI value in the handset unit is judged to be larger than the first predetermined value, and
sets the handset unit power to one of "H" and "L" responsive to the request from the base unit.

4. A control method of handset unit transmission power in the cordless telephone for making radio communications between a base unit and a handset unit comprising the steps of:
   a) outputting a control signal including a request for controlling the transmission power of the handset unit, depending on the CRC error rate (CRCE) and received signal strength indicator (RSSI) value of the base unit, in the base unit, and
   b) controlling the handset unit, by receiving the control signal, in the handset unit,
wherein step a) includes the steps of:
   i) requesting the handset unit controller to set the transmission power of the handset unit (handset unit power) to high value when the CRCE is larger than a predetermined error rate,
   ii) requesting the handset unit to set the transmission power of the handset unit to high value when the RSSI value is not more than a predetermined value, and
   iii) requesting the handset unit to set the handset unit power to low value when the CRCE is not more than the predetermined error rate and the RSSI value is larger than the predetermined value, and
step b) includes the step of:
   setting the handset unit power based on at least one of the control signal from the base unit and a determination by the handset unit.

5. The control method of handset unit power of claim 4,
wherein step a) further comprises the steps of:
   a-1) judging whether the handset unit power information is "H" or "L",
   a-2) comparing the RSSI value in the base unit with at least one of a first predetermined value and a second predetermined value not more than the first predetermined value,
   a-3) comparing the CRC error rate with the predetermined error rate, and
   a-4) making at least one of requesting and noticing the handset unit, and
step a-4) further comprises the steps of:
   i) requesting the handset unit to set the handset unit power to "L" when the handset unit power information is judged to be "H", the CRC error rate is judged to be not more than the predetermined error rate, and the RSSI value is judged to be not less than the first predetermined value,
   ii) requesting the handset unit to set the handset unit power to "H" when the handset unit power information is judged to be "L", and the RSSI value is judged to be not more than the second predetermined value, and
   iii) requesting the handset unit to set the handset unit power to "H" when the handset unit power information is judged to be "L", the RSSI value is judged to be larger than the second predetermined value, and the CRC error rate is judged to be larger than the predetermined error rate.

6. The control in method of handset unit power of claim 5, wherein step b) further comprises the steps of:
   b-1) judging the handset unit power information,
   b-2) comparing the RSSI value in the handset unit with a first predetermined value or the second predetermined value,
   b-3) judging the data from the base unit, and
   b-4) setting the handset unit power, and
step b-4) further comprises the steps of:
   setting the handset unit power to "H" when the handset unit power information is judged to be "L", and the RSSI value in the handset unit is judged to be not more than the second predetermined value,
   setting the handset unit power to "L" when the handset unit power information is judged to be "H", and the RSSI value in the handset unit is judged to be larger than the first predetermined value, and
   setting the handset unit power one of "H" and "L" responsive to the request from the base unit.

* * * * *